United States Patent [19]

Hack et al.

[11] Patent Number: 4,708,190

[45] Date of Patent: Nov. 24, 1987

[54] TREATING METALS AND/OR METALLIC COMPOUNDS

[75] Inventors: Robert Hack, Lahnau; Helmut Strzala, Braunfels, both of Fed. Rep. of Germany

[73] Assignee: Arthur Pfeiffer Vakuumtechnik Wetzlar GmbH, Fed. Rep. of Germany

[21] Appl. No.: 887,992

[22] Filed: Jul. 18, 1986

[30] Foreign Application Priority Data

Jul. 19, 1985 [DE] Fed. Rep. of Germany ....... 3525747

[51] Int. Cl.⁴ .............................................. B22D 1/00
[52] U.S. Cl. ................................ 164/76.1; 164/270.1; 164/266; 75/10.29; 266/149
[58] Field of Search .................... 164/66.1, 67.1, 68.1, 164/76.1, 266, 270.1, 61, 253, 258; 266/149; 75/10.29, 10.33

[56] References Cited

U.S. PATENT DOCUMENTS

| 3,663,001 | 5/1972 | Ishizuka | 266/149 |
| 3,767,381 | 10/1973 | Bielefeldt | 266/149 |
| 3,803,335 | 4/1974 | Esjutin et al. | 266/149 |
| 4,147,534 | 4/1979 | Hori | 75/10.33 |

FOREIGN PATENT DOCUMENTS 0047665 3/1982 European Pat. Off. .
997402 7/1965 United Kingdom .

Primary Examiner—Nicholas P. Godici
Assistant Examiner—Richard K. Seidel
Attorney, Agent, or Firm—Toren, McGeady & Associates

[57] ABSTRACT

Metals and/or metallic compounds are condensed from a vapor in a reaction vessel into a condenser, the condensate initially solidifying to block an outlet at the bottom of condenser; subsequent operation of heating stages from the top to the bottom of the condenser to melt the solidified condensate ensures that, as the outlet becomes unblocked, the whole melt flows into a mould.

8 Claims, 1 Drawing Figure

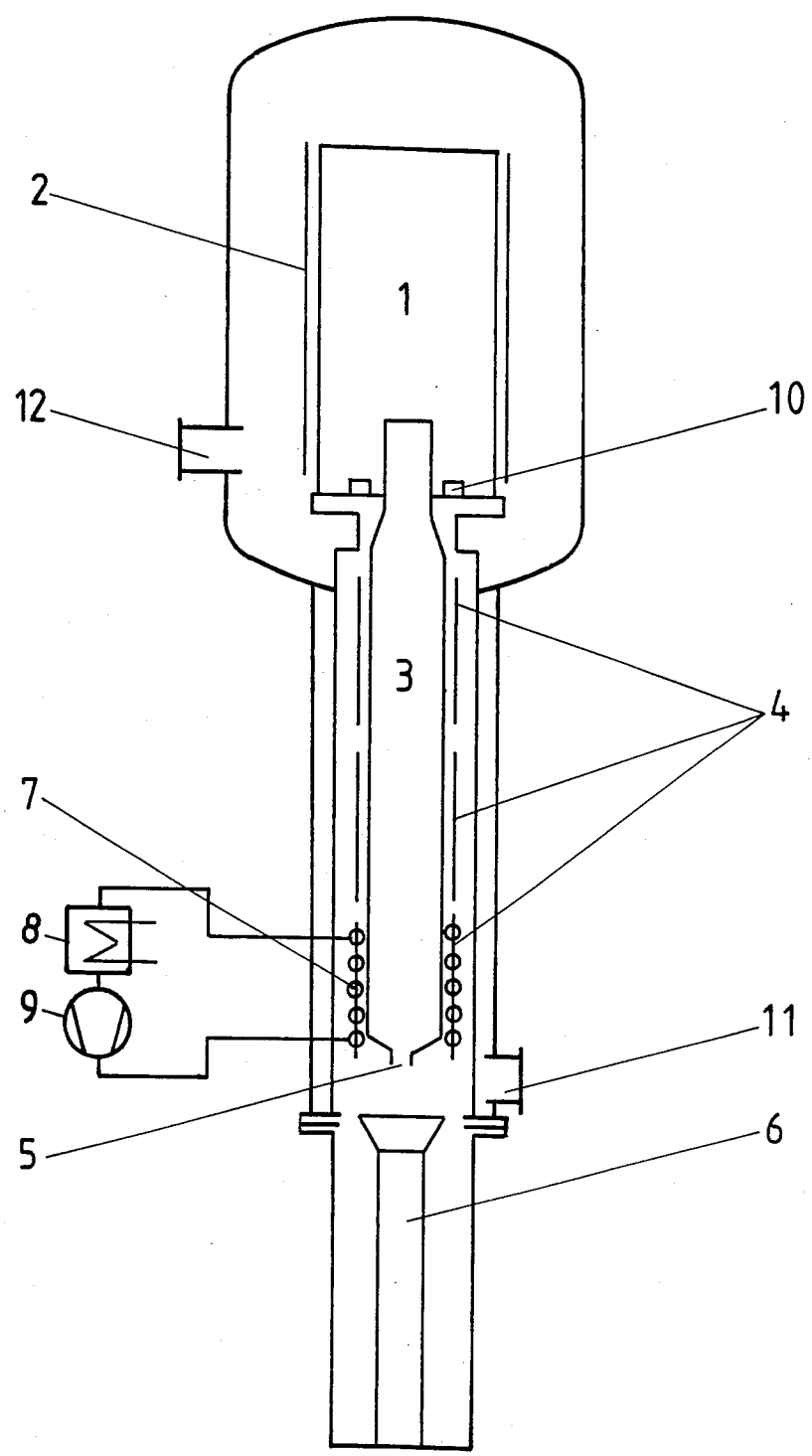

TREATING METALS AND/OR METALLIC COMPOUNDS

BACKGROUND OF THE INVENTION

The invention relates to an apparatus for handling or treating metals and/or metal compounds preferably under vacuum, and more particularly to the distillation of metals and/or metallic compounds e.g. metal oxides. In the course of this, a metallic compound to be reduced, for example, is brought into contact with a baser metal. After heating up to the reaction temperature, the reduction takes place under vacuum. The temperature is above the boiling point of the metal being formed so that, after the process, this is present in vapour form and must then be condensed.

Installations for the distillation of metals and/or metallic compounds are known wherein there is a condenser above the reaction vessel. The metal condensed in this then has to be removed mechanically. This operation is laborious and in addition it represents a separate operation during which the whole process is interrupted.

SUMMARY OF THE INVENTION

The present invention seeks to construct the whole installation so that all the steps necessary for the process, namely distillation, condensation, solidification, melting and casting can be carried out in one installation without any interruption in the process, and that, after the condensation of the metal or of the metallic compound obtained in the solid state, melting out is possible and that the melt can then be controlled in a separate chill mound so that the whole installation is immediately available again for the next work cycle.

According to a first aspect, the present invention provides an apparatus for treating metals and/or metallic compounds comprising a reaction vessel, said reaction vessel producing a vapour, a condenser located below said reaction vessel, said condenser receiving and condensing said vapour to produce a condensate, said condenser being equipped with heating means for melting said condensate, and there being provided at a lower end of said condenser an opening, wherein the apparatus can be evacuated through said opening, and said opening also serves as an outlet for said melted condensate.

According to a second aspect, the present invention provides a method of treating metals and/or metallic compounds, wherein the following operations are carried out in succession in one apparatus: distillation, condensation in a condenser, solidification to produce a solidified condensate, melting and casting in a mould below said condenser, said condenser having an opening therein, and the solidification and melting operations taking place in such a manner that first said opening in the condenser is closed by said solidified condensate, the said condensate is then melted from the top downwards by means of a multiple-stage heating process, the stages of which are switched on in succession from the top downwards, so that, after said opening has been melted open by melting of the solidified condensate thereat, the whole melted condensate can flow away as a casting into said mould.

According to a third aspect, the present invention provides a method of treating metals and/or metallic compounds comprising condensation from a vapour to produce a liquefied condensate, collecting said liquefied condensate in a condenser and allowing it to solidify at a bottom region thereof, said condenser having an outlet at said bottom region, and subsequently applying heat to said collected and solidified condensate, whereby to melt it so that it flows out of said opening.

BRIEF DESCRIPTION OF THE DRRAWING

A preferred embodiment of the present invention will now be described, by way of example only, with reference to the accompanying drawing, which shows an apparatus for treating metals and/or metal compounds.

DESCRIPTION OF THE PREFERRED EMBODIMENT

Basically the present invention provides an apparatus for treating metals and/or metallic compounds comprising a reaction vessel above a condenser which is equipped with heating means for melting the condensate, and there being provided at the lower end of the condenser an opening through which the apparatus can be evacuated and which also serves as an outlet for the melted condensate.

The invention also provides a method of treating metals and/or metallic compounds, wherein the following operations are carried out in succession in one apparatus distillation, condensation in a condenser, solidification, melting and casting, the solidification and melting operations taking place in such a manner that first an opening in the condenser is closed by the solidified condensate and the condensate then melts from the top downwards by means of a multiple-stage heating process the stages of which are switched on in succession from the top downwards, so that, after the opening has been melted open, the whole melt can flow away as a casting into a mould which is below the condenser.

The invention also provides a method of treating metals and/or metallic compounds comprising condensation from a vapour, collecting the liquefield condensate in a condenser and allowing it to solidify at the bottom region thereof, the condenser having an outlet at the bottom region thereof, and subsequently applying heat to the collected and solidified condensate whereby to melt it so that it flows out of the opening.

In order to draw off the heat of condensation in the condenser, a cooling device may be provided which is connected to a heat exchanger and a circulation pump.

Referring now to the drawing, a reaction vessel 1 has an associated heating arrangement 2. Below these there is a condenser 3 which is surrounded by a multiple-zone heating means 4 which consists of three zones in the present example. The lower end of the condenser is formed by the pouring opening 5. The melt is collected in a chill mould 6. A cooling device 7 at the lower end of the condenser is connected to a heat exchanger 8 and to a circulation pump 9.

The reaction vessel 1 is evacuated through the vacuum connection 11 and the condenser 3. The vacuum connection 12 serves to establish a pressure equalization between an outer furnace chamber and the reaction vessel 1.

A work cycle will now be described by way of example.

The substances to be reacted with one another, for example an oxide of a first metal and a second, baser metal, are placed in the reaction vessel 1 as a charge 10. The heating up is effected under vacuum, at a pressure of about $10^{-2}$ mbar, until reduction occurs. Since an exothermic reaction occurs the temperature rises still further as a result of the energy released to beyond the vaporizing temperature of the first metal so that this is now in the vapour state. Because of the vapour pressure drop, this metal vapour is conveyed into the condenser 3. At first only the upper zone of the multiple-zone heating means 4 is in operation. The temperature in this region is below the vaporizing temperature of the metal. In the lower region, the temperature is below the melting point. The metal vapour therefore condenses in the upper region of the condenser and solidifies in the lower region. In the course of this, the opening 5 is closed. Then the other zones of the heating means are set in operation from the top downwards and the metal melts from the top downwards until the opening 5 is melted open. The metal can now flow as a casting into the chill mould 6.

The above described arrangement has the advantages that, after the end of the process, a compact casting is obtained, the condenser is emptied and, after the chill mould has been changed, the installation is immediately available again for the next charge.

It will be understood that the above description of the present invention is susceptible to various modifications, changes and adaptations.

What is claimed is:

1. An apparatus for treating metals and/or metallic compounds comprising a reaction vessel, said reaction vessel producing a vapor, a condenser located below said reaction vessel, said condenser receiving and condensing said vapor to produce a solid condensate, said condenser being equipped with a multiple-stage heating unit for melting said solid condensate, the stages of the multiple-stage heating unit arranged one below the other and surrounding the condenser, the stages connected in such a way that the stages are heated successively from the top stage toward the bottom stage, and there being provided at a lower end of said condenser an opening, wherein the apparatus can be evacuated through said opening, and said opening also serves as an outlet for said melted condensate.

2. An apparatus as claimed in claim 1, wherein a mould is provided below said condenser to collect said melted condensate.

3. An apparatus as claimed in claim 1, wherein a cooling device is provided at a lower portion of said condenser.

4. An apparatus as claimed in claim 3, wherein said cooling device is supplemented by a heat exchanger and a circulation pump.

5. An apparatus according to claim 1, wherein said metals and/or metallic compounds are treated under vacuum.

6. An apparatus according to claim 1, wherein the metals and/or metallic compounds are distilled.

7. A method of treating metals or metallic compounds in one apparatus, comprising the steps of distilling the metals or metal compounds, condensing the distillate in a condenser having an opening at the lower end thereof, solidifying the condensate to obtain a solidified condensate, such that initially the opening of the condenser is closed by the solidified condensate, melting the solidified condensate by applying heat by means of a multiple-stage heating unit, the stages of the multiple-stage heating unit being switched on successively from top toward bottom so that, after the solidified condensate closing the opening of the condenser has been melted, the entire melted condensate flows out of the condenser and is cast into a mold below the condenser.

8. A method as claimed in claim 7, further comprising the step of reducing a metallic compound prior to the distilling step.

* * * * *